United States Patent
Ito et al.

(10) Patent No.: US 11,215,253 B2
(45) Date of Patent: Jan. 4, 2022

(54) VARIABLE STIFFNESS BUSHING ASSEMBLY

(71) Applicant: HONDA MOTOR CO., LTD., Tokyo (JP)

(72) Inventors: Yuho Ito, Wako (JP); Toshio Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 65 days.

(21) Appl. No.: 16/787,683

(22) Filed: Feb. 11, 2020

(65) Prior Publication Data

US 2020/0263751 A1 Aug. 20, 2020

(30) Foreign Application Priority Data

Feb. 15, 2019 (JP) .............................. JP2019-025089

(51) Int. Cl.
*F16F 1/36* (2006.01)
*F16F 1/387* (2006.01)

(52) U.S. Cl.
CPC ............ *F16F 1/361* (2013.01); *F16F 1/3615* (2013.01); *F16F 1/387* (2013.01);
(Continued)

(58) Field of Classification Search
CPC .......... F16F 1/361; F16F 1/3615; F16F 1/387; F16F 2224/045; F16F 2228/066; B60G 2204/41062
See application file for complete search history.

(56) References Cited

U.S. PATENT DOCUMENTS 5,050,850 A     9/1991   Noguchi et al.
5,460,585 A * 10/1995   Gentry ............... A63B 21/0056
                                                                                     482/1

(Continued)

FOREIGN PATENT DOCUMENTS

CN    101253347 A    8/2008
CN    103668869 A    3/2014
(Continued)

OTHER PUBLICATIONS

First Notification of Office Action for Application CN 202010082590.2 dated May 7, 2021; 20 pp.

*Primary Examiner* — Xuan Lan Nguyen
(74) *Attorney, Agent, or Firm* — Armstrong Teasdale LLP

(57) ABSTRACT

A variable stiffness bushing assembly includes an inner tubular member, an outer tubular member coaxially surrounding the inner tubular member, and an elastic member connecting the inner and outer tubular members. The elastic member defines a pair of first liquid chambers that are on opposite sides of an axial line of the inner tubular member and communicate with each other via a first circumferentially extending communication passage defined between one of the outer yokes and the annular large diameter portion, and a pair of second liquid chambers that are on opposite sides of the axial line and communicate with each other via a second circumferentially extending communication passage defined between another one of the outer yokes and the annular large diameter portion. The magnetic fields generated by the two coils are selectively applied to a magnetic fluid flowing through the first communication passage and the second communication passage.

5 Claims, 6 Drawing Sheets

(52) U.S. Cl.
CPC .............. *B60G 2204/41062* (2013.01); *F16F 2224/045* (2013.01); *F16F 2228/066* (2013.01)

(56) References Cited

U.S. PATENT DOCUMENTS

| | | | | |
|---|---|---|---|---|
| 5,816,587 | A | * 10/1998 | Stewart | ............... F16D 65/0012 |
| | | | | 280/5.516 |
| 9,835,218 | B2 | * 12/2017 | Inoue | ..................... F16F 7/1011 |
| 2018/0066723 | A1 | * 3/2018 | Inoue | ...................... F16F 15/03 |
| 2020/0263730 | A1 | * 8/2020 | Ito | .......................... F16F 9/535 |

FOREIGN PATENT DOCUMENTS

| | | | |
|---|---|---|---|
| CN | 104191927 | A | 12/2014 |
| EP | 0784163 | A1 | 7/1997 |
| EP | 1705400 | A1 | 9/2006 |
| JP | S61205503 | A | 9/1986 |
| JP | S63176844 | A | 7/1988 |
| JP | H023721 | A | 1/1990 |
| JP | H07280024 | A | 10/1995 |
| JP | 2005249022 | A | 9/2005 |
| KR | 20030013719 | A | 2/2003 |

\* cited by examiner

VARIABLE STIFFNESS BUSHING ASSEMBLY

TECHNICAL FIELD

The present invention relates to an elastic bushing assembly configured to be interposed between a vibration source and a support member that supports the vibration source, and more particularly to a variable stiffness bushing assembly that can change the stiffness thereof.

BACKGROUND ART

A known elastic bushing assembly includes an inner tubular member fixed to a vehicle body, an outer tubular member that surrounds the inner tubular member and is fixed to a lower arm of a wheel suspension device, and an elastic member provided between the inner tubular member and the outer tubular member. See JP2005-249022A, for instance. When the wheel rides over a bump on the road surface, a rearward force is applied to the lower arm so that the elastic bushing receives a load directed rearward. When the vehicle corners at high speed, the wheel suspension device is subjected to a large lateral load so that the elastic bushing receives a load directed laterally.

According to this prior art, the inner tubular member of the elastic bushing assembly is fixed to the vehicle body such that the axial line thereof extends in the vertical direction. The bushing member of the bushing assembly is formed with an opening so that the stiffness of the bushing member with respect to a rearwardly directed loading is reduced. Thereby, the ride quality of the vehicle can be improved while the driving stability of the vehicle during cornering can be ensured because the wheel suspension device is provided with an adequate stiffness with respect to a lateral loading.

The elastic bushing assembly according to the prior art thus demonstrate different stiffness depending on the direction of the loading. As a further development of such an elastic bushing assembly, it is conceivable to allow the stiffness of the elastic bushing assembly according to the operating condition of the vehicle. For instance, the stiffness may be increased when the handling of the vehicle is desired to be improved, and decreased when the transmission of noise and vibration from the wheel to the vehicle body is desired to be minimized.

SUMMARY OF THE INVENTION

In view of such a recognition and the problems associated with the prior art, a primary object of the present invention is to provide an elastic bushing assembly that can vary the stiffness thereof depending on both the operating condition and the direction of the loading applied thereto.

To achieve such an object, the present invention provides a variable stiffness bushing assembly (1), comprising: an inner tubular member (11): an outer tubular member (12) coaxially surrounding the inner tubular member to define a gap therebetween; an elastic member (13) positioned in the gap and connecting the inner tubular member and the outer tubular member to each other; wherein the inner tubular member includes an inner yoke (20) having a tubular annular large diameter portion (25) extending radially outward, a pair of coils (21) wound coaxially around respective parts of an outer periphery of the inner yoke located on either side of the annular large diameter portion so as to generate magnetic fields directed in mutually opposing directions, and a pair of tubular outer yokes (22) disposed coaxially with respect to the inner yoke and each connected to the inner yoke at one end thereof located on an end portion of a corresponding one of the coils remote from another of the coils, another end of each outer yoke opposing the annular large diameter portion, and wherein the elastic member defines a pair of first liquid chambers (41) that are on opposite sides of an axial line of the inner tubular member, the first liquid chambers being communicated with each other via a first communication passage (47) defined between one of the outer yokes and the annular large diameter portion and extending circumferentially, and a pair of second liquid chambers (42) that are on opposite sides of the axial line of the inner tubular member, the second liquid chambers being communicated with each other via a second communication passage (49) defined between another one of the outer yokes and the annular large diameter portion and extending circumferentially, the first liquid chambers, the second liquid chambers, the first communication passage, and the second communication passage being filled with a magnetic fluid (50) having a viscosity that changes depending on an intensity of a magnetic field applied thereto.

According to this configuration, a pair of magnetic circuits are formed by the two coils in cooperation with the inner yoke and the outer yokes in such a manner that when a current is passed through one of the coils, a magnetic field corresponding to the magnitude of the current is generated between the corresponding outer yoke and the annular large diameter portion, and the viscosity of the magnetic fluid contained in the corresponding communication passage is increased according to the current supplied to the corresponding coil. Thereby, the movement of the magnetic fluid between the first liquid chambers and/or between the second liquid chambers is impeded in a selective manner. Thus, the stiffness of the variable stiffness bushing assembly can be changed as desired, typically depending on the operating condition of the vehicle, and can be varied depending on the direction in which the loading is applied. In other words, the stiffness with respect to two different directions can be individually varied.

Preferably, the first liquid chambers are arranged in a first direction (Y) orthogonal to the axial line (X) of the inner tubular member, and the second liquid chambers are arranged in a second direction (Z) orthogonal to the first direction and the axial line of the inner tubular member.

Thereby, the stiffness of the variable stiffness bushing assembly can be varied individually in two different directions which are orthogonal to the axial line. The first direction may be at an angle to the second direction typically at a 90 degree angle.

Preferably, the variable stiffness bushing assembly further comprises an intermediate tubular member (23) made of nonmagnetic material and surrounding gaps (SA, SB) defined between the annular large diameter portion and the outer yokes from outside, the intermediate tubular member defining the first communication passage and the second communication passage in cooperation with the annular large diameter portion and the outer yokes.

Thereby, the first communication passage and the second communication passage can be formed in a simple manner without interfering with the magnetic circuits formed by the inner yoke and the outer yokes.

Preferably, the intermediate tubular member is provided with a pair of protruding portions (31) protruding radially inward and extending circumferentially, and abutting against an outer periphery of the coils.

According to this configuration, the gaps between the inner tubular member and the intermediate tubular member are closed and sealed by the projecting portions in the circumferential direction so that the communication passages are formed in an arcuate manner or in particular in a semi-circular configuration. Thus, the first liquid chambers are communicated with each other via a single passage provided by the first communication passage, and the second liquid chambers are communicated with each other via a single passage provided by the second communication passage, whereby the flow of the magnetic fluid in the first communication passage and the second communication passage can be effectively impeded by the application of a magnetic field so that the stiffness of the variable stiffness bushing assembly can be controlled in a favorable manner.

Thus, the present invention provides an elastic bushing assembly that can vary the stiffness thereof depending on both the operating condition and the direction of the loading applied thereto. Typically, the variable stiffness bushing assembly is configured to be interposed between an inboard end of an arm member of a wheel suspension device and a vehicle body.

BRIEF DESCRIPTION OF THE DRAWING(S)

BEST MODE FOR CARRYING OUT THE INVENTION

Figure 1:
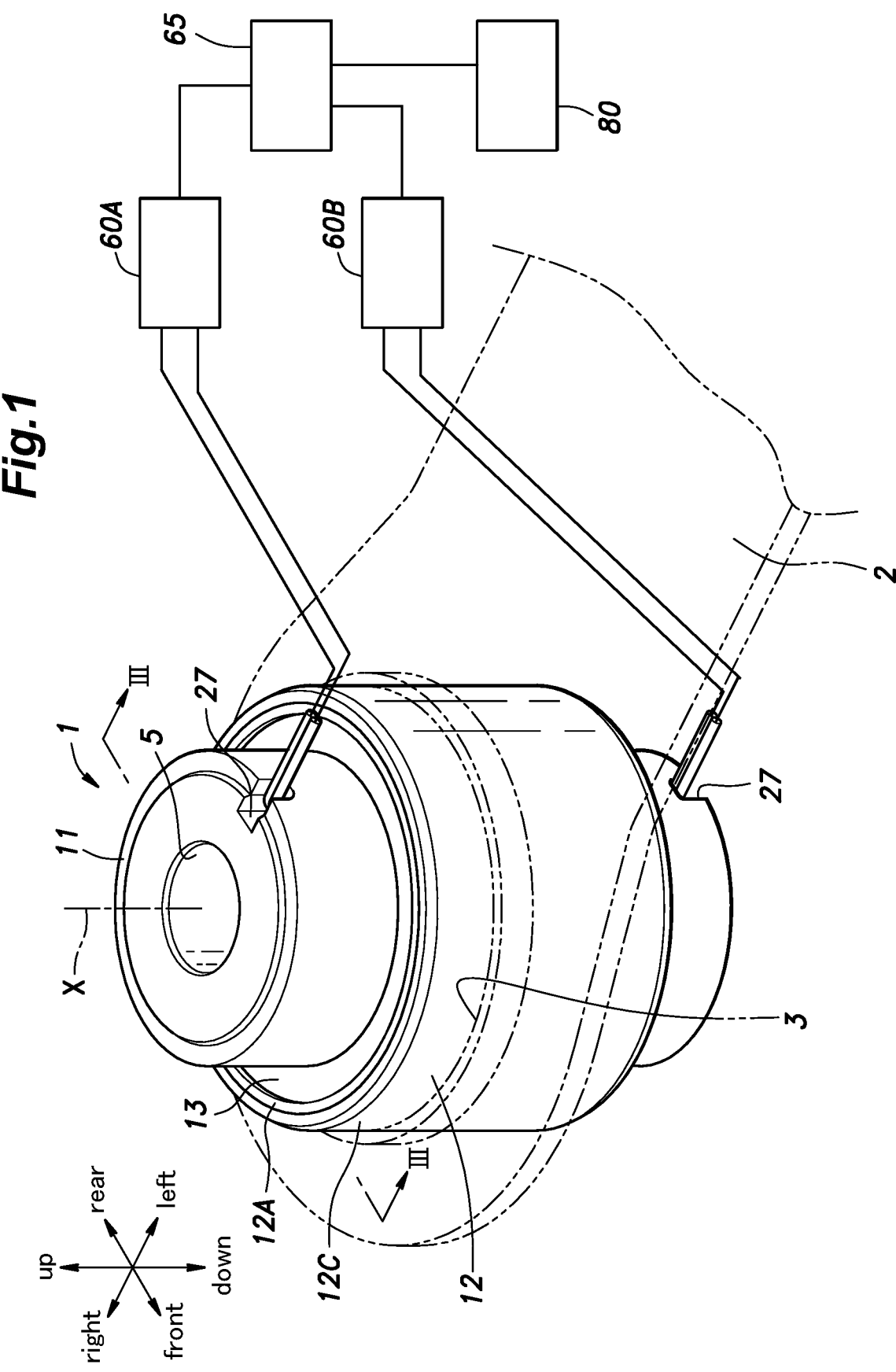
FIG. 1 is a schematic perspective view of a variable stiffness bushing assembly according to an embodiment of the present invention as mounted to a lower arm of a wheel suspension device.

A variable stiffness bushing assembly 1 according to a preferred embodiment of the present invention as applied to a wheel suspension device of a vehicle is described in the following with reference to the appended drawings.

The variable stiffness bushing assembly 1 of the present invention is provided on a lower arm 2 of the wheel suspension device consisting of a double wishbone type suspension device for connecting a knuckle (not shown in the drawings) that rotatably supports a rear wheel to the vehicle body. In particular, the variable stiffness bushing assembly 1 is provided at the vehicle body side end of the lower arm 2.

The lower arm 2 is a metal member extending in the lateral direction, and is connected to a knuckle at the outer end thereof. As shown in FIG. 1, a through hole 3 is vertically passed through the inner end of the lower arm 2, and the variable stiffness bushing assembly 1 having a generally cylindrical shape is fitted into the through hole 3 such that the axial line X (axial direction X) is directed in the vertical direction. The variable stiffness bushing assembly 1 is provided with a bolt hole 5 extending centrally along the axial line X, and a bolt is passed through the bolt hole 5 to be fastened to the vehicle body so that the inner end of the lower arm 2 is connected to the vehicle body via the variable stiffness bushing assembly 1. The orientation of the variable stiffness bushing assembly 1 in this embodiment is only exemplary, and does not limit the scope of the present invention.

The variable stiffness bushing assembly 1 includes a cylindrical inner tubular member 11 coaxially disposed in relation to the axial line X, and an outer tubular member 12 which is disposed coaxially with respect to and surrounds the inner tubular member 11. Thus, an annular or a cylindrical gap is defined between the inner tubular member 11 and the outer tubular member 12. The variable stiffness bushing assembly 1 further includes an elastic member 13 that is interposed between the inner tubular member 11 and the outer tubular member 12, and connects the inner tubular member 11 and the outer tubular member 12 to each other.

Figure 2:
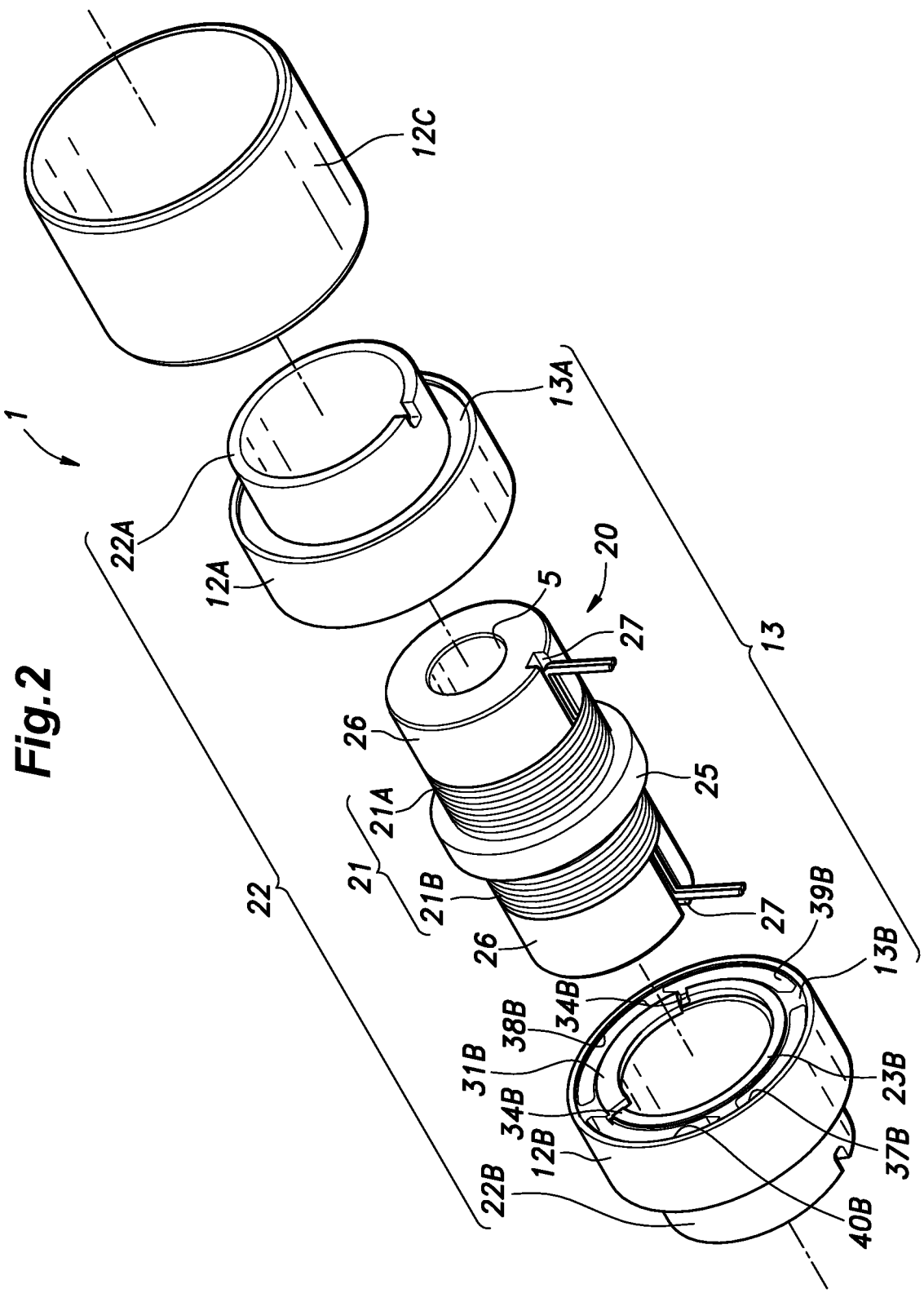
FIG. 2 is an exploded perspective view of the variable stiffness bushing assembly.

The inner tubular member 11 extends along the axial line X extending vertically. As shown in FIG. 2, the inner tubular member 11 includes a substantially cylindrical inner yoke 20 that internally defines the bolt hole 5, a pair of coils 21 wound around the inner yoke 20 in an axially spaced apart relationship, a pair of outer yokes 22 each connected to the inner yoke 20 at one end thereof located on an end part of the corresponding coil 21 remote from the other coil 21, the other ends of the outer yokes 22 axially opposing each other, and an intermediate tubular member 23 surrounding the coils 21 and axially abutting against the mutually opposing ends of the outer yokes 22. Thus, the intermediate tubular member 23 is axially interposed between the opposing axial ends of the outer yokes 22.

The inner yoke 20 and the outer yokes 22 are made of a magnetic material or a material having a high magnetic permeability such as iron based material.

Figure 3:
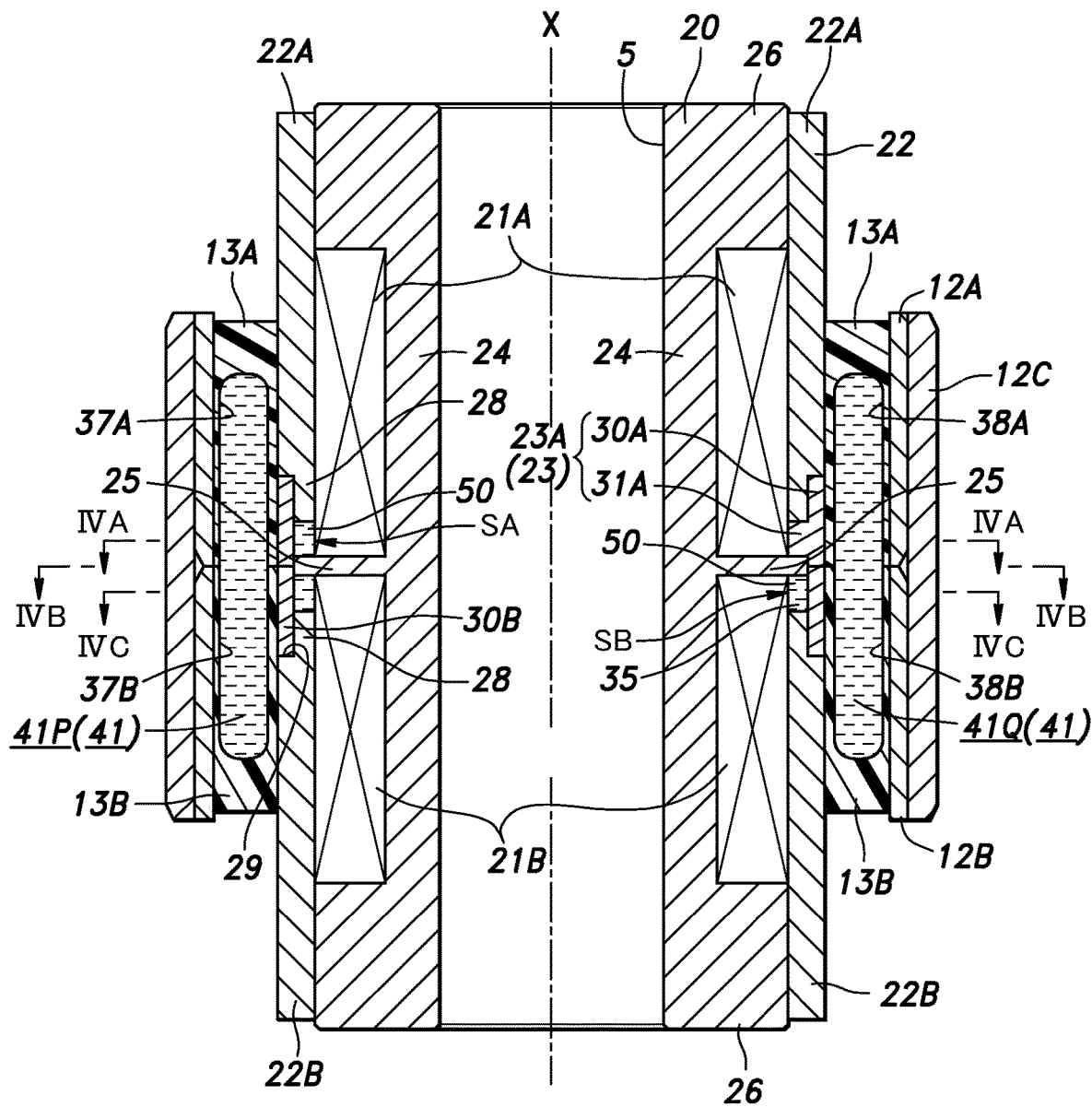
FIG. 3 is a sectional view taken along line of FIG. 1.

As shown in FIG. 3, the inner yoke 20 includes a cylindrical inner yoke main body 24 extending along the axial line X, an annular large diameter portion 25 projecting radially outward from an axially central part of the inner yoke main body 24, and a pair of annular flanges 26 projecting radially outward from either axial end of the inner yoke main body 24. In the present embodiment, the annular flanges 26 have a same outer diameter which is slightly smaller than the outer diameter of the annular large diameter portion 25.

As shown in FIG. 2, the coils 21 are formed by winding a coated copper wire around an upper part and a lower part of the inner tubular member 11 located on either axial side of the annular large diameter portion 25 in a substantially coaxial relationship. In the present embodiment, the upper coil 21 (which may be referred to as the upper coil 21A) and the lower coil 21 (which may be referred to as the lower coil 21B) have a same axial length and a same number of turns. Further, the winding direction of the upper coil 21A and the winding direction of the lower coil 21B are reversed from each other. In the present embodiment, the outer diameters of the upper coil 21A and the lower coil 21B are substantially equal to each other, and the outer peripheral surface of the upper coil 21A and the outer peripheral surface of the lower coil 21B are flush with the outer peripheral surfaces of the upper and lower annular flanges 26. The upper coil 21A is in contact with an annular shoulder surface defined by the annular large diameter portion 25 at the lower end, and is in contact with an annular shoulder surface defined by the upper annular flange 26 at the upper end. The lower coil 21B is in contact with an annular shoulder surface defined by the annular large diameter portion 25 at the upper end, and is in contact with an annular shoulder surface defined by the lower annular flange 26 at the lower end.

Each annular flange 26 is provided with a lead slot 27 which is recessed radially inward from the outer circumferential surface, and extends over the entire vertical length of the annular flange 26. Lead wires of the copper wire of each coil 21 are passed axially through the corresponding lead slot 27. The inner yoke 20 functions as an iron core that conducts the magnetic flux generated by the coils 21 when electric current is supplied thereto.

The outer yokes 22 each have a cylindrical shape extending along the axial line X. As shown in FIG. 3, each of the outer yokes 22 is press fitted onto the annular flange 26 on the corresponding axial side of the inner yoke 20, and surrounds the corresponding coil 21 so that an axial end of the outer yoke 22 axially opposes the annular large diameter portion 25 of the inner yoke 20. Thus, an annular gap SA, SB is defined between the annular large diameter portion 25 and the opposing axial end of each outer yoke 22. Hereinafter, the outer yoke 22 connected to the upper end of the inner yoke 20 may be referred to as an upper outer yoke 22A, and the outer yoke 22 connected to the lower end of the inner yoke 20 may be referred to as a lower outer yoke 22B.

The upper outer yoke 22A has an inner diameter substantially equal to the outer diameter of the upper annular flange 26 and the upper coil 21A so that the upper annular flange 26 and the upper coil 21A are snugly received in the upper outer yoke 22A.

The lower outer yoke 22B likewise has an inner diameter substantially equal to the outer diameter of the lower annular flange 26 and the lower coil 21B so that the lower annular flange 26 and the lower coil 21B are snugly received in the lower outer yoke 22B.

The upper outer yoke 22A and the lower outer yoke 22B are made of a metal material having a high magnetic permeability or ferromagnetic material. In this embodiment, the upper outer yoke 22A and the lower outer yoke 22B are made of iron based material.

The lower end portion of the upper outer yoke 22A and the upper end portion of the lower outer yoke 22B are provided with cylindrical small diameter portions 28, respectively, that protrude toward each other along the axial line X of the inner yoke 20, each small diameter portion 28 having a smaller outer diameter than the remaining part of the outer yokes 22. Each small diameter portion 28 defines an annular shoulder surface extending substantially orthogonally to the axial line X at the base end thereof.

The intermediate tubular member 23 has a generally cylindrical shape, and is disposed axially between the upper outer yoke 22A and the lower outer yoke 22B. The inner yoke 20 extends through the inner bore of the intermediate tubular member 23 together with the upper and lower coils 21, and the outer peripheral surface of the annular large diameter portion 25 contacts the inner peripheral surface of the intermediate tubular member 23 as shown in FIG. 3. The intermediate tubular member 23 surrounds and covers the gap SA between the upper outer yoke 22A and the annular large diameter portion 25 and the gap SB between the lower outer yoke 22B and the annular large diameter portion 25 from the radially outer side. The intermediate tubular member 23 may be formed of a non-magnetic material (preferably, a non-magnetic metal) having a lower magnetic permeability than the metal forming the inner yoke 20. Specifically, the intermediate tubular member 23 is preferably made of aluminum.

The intermediate tubular member 23 consists of a pair of tubular members 23A and 23B that are axially abutting each other. Since the lower tubular member 23B is substantially identical in shape as the upper tubular member 23A, only the upper tubular member 23A will be described in the following in detail. The parts of the intermediate tubular member 23 may each be accompanied by a suffix A or B depending on which of the upper tubular member 23A and the lower tubular member 23B the particular part is associated with.

Figure 4A:
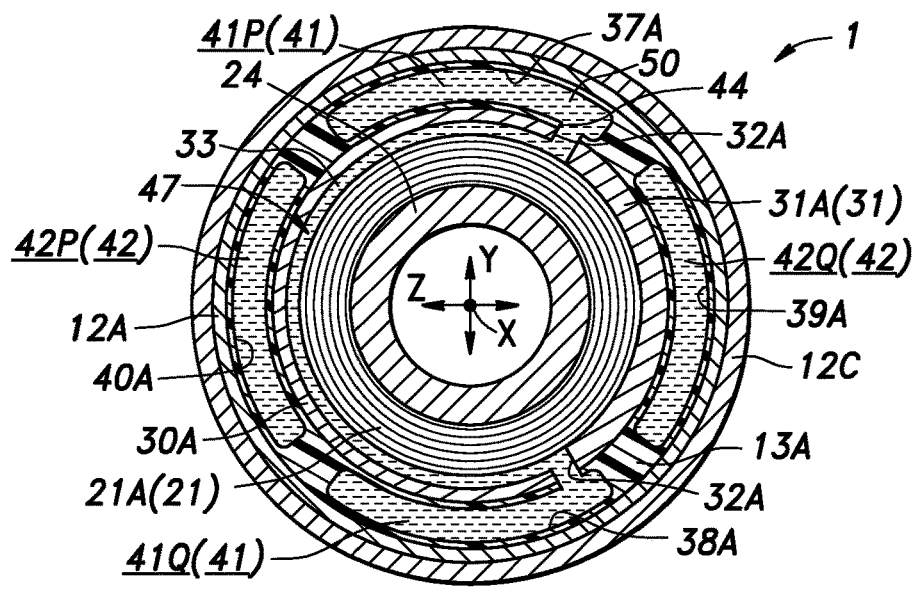
FIG. 4A is a sectional view taken along line IVA-IVA of FIG. 3.

As shown in FIG. 4A, the upper tubular member 23A includes a cylindrical upper tubular member main body 30A and a protruding portion 31A protruding inward from the lower end of the inner peripheral surface of the upper tubular member main body 30A and elongated in the circumferential direction. As shown in FIG. 3, the inner diameter of the upper tubular member main body 30A is substantially equal to the outer diameter of the small diameter portion 28 of the upper outer yoke 22A. The small diameter portion 28 of the upper outer yoke 22A is snugly fitted in the upper tubular member main body 30A in such a manner that substantially no gap is defined between the outer peripheral surface of the small diameter portion 28 of the upper outer yoke 22A and the inner peripheral surface of the upper tubular member main body 30A. The upper end of the upper tubular member main body 30A abuts against the shoulder surface 29 of the upper outer yoke 22A. The lower end of the upper tubular member main body 30A is positioned at a substantially central part with respect to the vertical direction of the annular large diameter portion 25, and is connected to the upper end of the lower tubular member main body 30B of the lower tubular member 23B. The inner peripheral surface of the lower end of the upper tubular member main body 30A is in contact with the outer peripheral surface of the annular large diameter portion 25.

The protruding portion 31A has a cylindrical inner peripheral surface, and extends over a certain angular range when viewed from above as shown in FIG. 4A. The protruding portion 31A protrudes from the lower end of the inner peripheral surface of the upper tubular member main body 30A, and fills the gap SA defined between the lower end of the upper outer yoke 22A (in particular, the small diameter portion 28 of the upper outer yoke 22A) and the annular large diameter portion 25. The lower surface of the protruding portion 31A abuts against the upper surface of the annular large diameter portion 25. Furthermore, the upper surface of the protruding portion 31A is in contact with the lower surface of the small diameter portion 28 of the upper outer yoke 22A. The inner peripheral surface of the protruding portion 31A abuts against the outer peripheral surface of the upper coil 21A. Thus, a first circumferential passage 33 is defined by the outer peripheral surface of the upper coil 21A, the inner peripheral surface of the upper tubular member main body 30A and the circumferential end surfaces of the protruding portion 31A. In the present embodiment, the circumferential length of the first circumferential passage 33 may be between ½ and ¾ of the full circle, or between the angular ranges of 180 degrees and 270 degrees.

The upper tubular member main body 30A is provided with a pair of first openings 32A penetrating in the radial direction at the respective circumferential ends of the protruding portion 31A so that the first circumferential passage 33 communicates with the radially outer side of the intermediate tubular member 23 via the first openings 32A. In the present embodiment, each first opening 32A is defined by a notch formed in the lower end of the upper tubular member main body 30A, and the upper edge of the lower tubular member main body 30B.

The lower tubular member 23B is vertically inverted, and rotated counterclockwise by 90 degrees as viewed from above with respect to the upper tubular member 23A. Similarly as the upper tubular member 23A, the small diameter portion 28 of the lower outer yoke 22B is snugly fitted into the lower tubular member 23B.

Figure 4B:
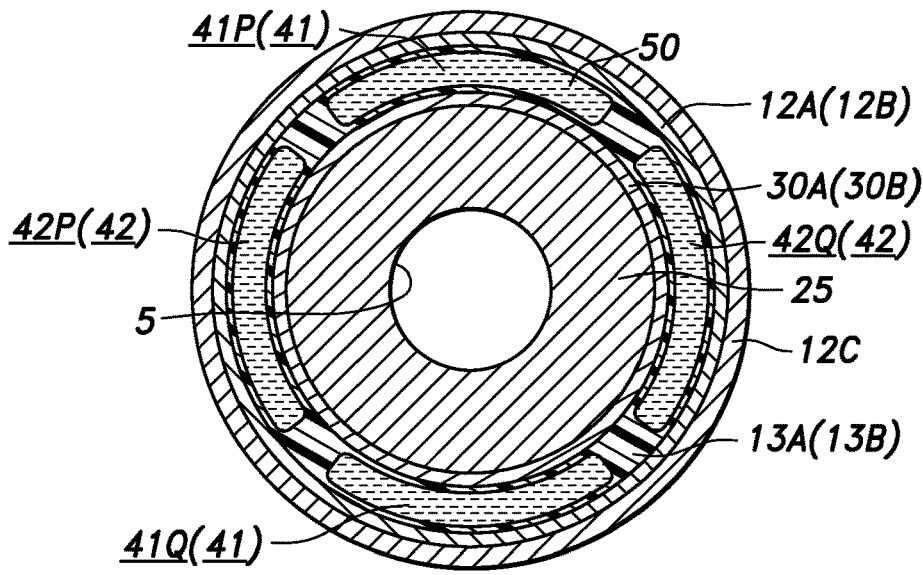
FIG. 4B is a sectional view taken along line IVB-IVB of FIG. 3.
Figure 4C:
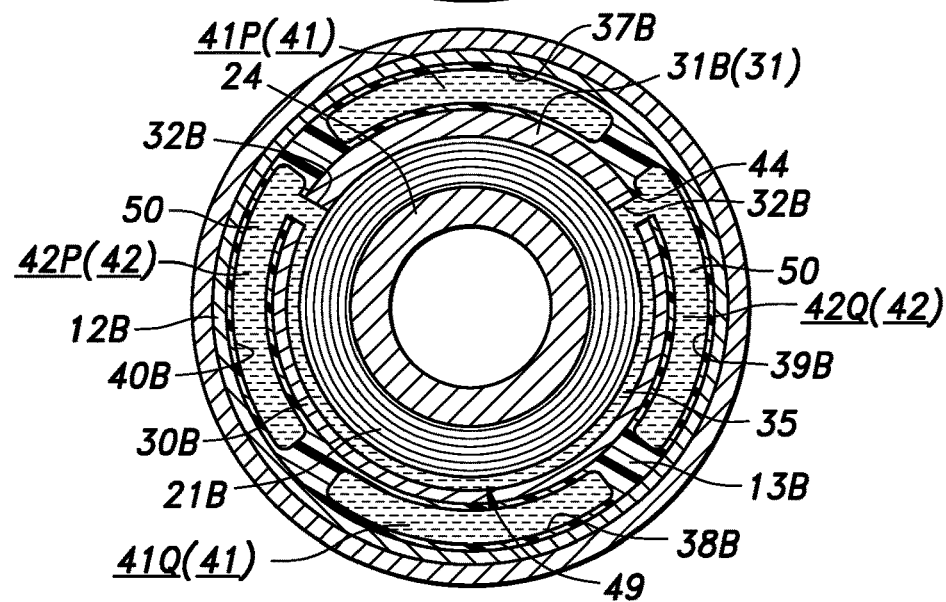
FIG. 4C is a sectional view taken along line IVC-IVC of FIG. 3.

As shown in FIG. 4C, the lower tubular member 23B includes a cylindrical lower tubular member main body 30B and a protruding portion 31B protruding inward from the upper end of the inner peripheral surface of the lower tubular member main body 30B and elongated in the circumferential direction. The protruding portion 31B protrudes into the gap defined between the lower outer yoke 22B and the annular large diameter portion 25, and closes the gap SB defined between the lower outer yoke 22B and the annular large diameter portion 25. Thus, a second circumferential passage 35 is defined by the outer peripheral surface of the lower coil 21B, the inner peripheral surface of the lower tubular member main body 30B and the circumferential end surfaces of the protruding portion 31B. The lower tubular member main body 30B is provided with a pair of second openings 32B penetrating in the radial direction at the respective circumferential ends of the protruding portion 31B so that the second circumferential passage 35 communicates with the radially outer side of the intermediate tubular member 23 via the second openings 32B. In the present embodiment, each second opening 32B is defined by a notch formed in the upper end of the lower tubular member main body 30B, and the lower edge of the upper tubular member main body 30A.

As shown in FIG. 3, the first circumferential passage 33 and the second circumferential passage 35 are spaced apart from each other in the vertical direction. The first circumferential passage 33 is disposed radially outer side of the lower end of the upper coil 21A, and the second circumferential passage 35 is disposed radially outer side of the upper end of the lower coil 21B. The first circumferential passage 33 and the second circumferential passage 35 are passed between the annular large diameter portion 25 and the outer yoke 22. The first circumferential passage 33 and the second circumferential passage 35 have a same shape, and the second circumferential passage 35 is located at a position rotated 90 degrees counterclockwise from the first circumferential passage 33 as viewed from above.

As shown in FIG. 2, the outer tubular member 12 includes an upper outer tubular member 12A, a lower outer tubular member 12B, and a housing member 12C surrounding the upper outer tubular member 12A and the lower outer tubular member 12B. The upper outer tubular member 12A and the lower outer tubular member 12B have a substantially same shape, and are arranged around the axial line X of the inner tubular member 11 in a coaxial relationship to the inner tubular member 11. The lower end of the upper outer tubular member 12A and the upper end of the lower outer tubular member 12B abut against each other. The housing member 12C has a cylindrical shape arranged around the axial line X in a coaxial relationship to the inner tubular member 11. The housing member 12C has an inner bore extending vertically, and the upper outer tubular member 12A and the lower outer tubular member 12B are received in the inner bore. The outer peripheral surface of the upper outer tubular member 12A and the outer peripheral surface of the lower outer tubular member 12B are in close contact with the inner peripheral surface of the housing member 12C, and the upper outer tubular member 12A and the lower outer tubular member 12B are integrally connected to the housing member 12C. The inner diameter of the outer tubular member 12, (the inner diameter of the upper outer tubular member 12A and the inner diameter of the lower outer tubular member 12B) is larger than the outer diameter of the inner tubular member 11, or more specifically, larger than the outer diameter of the outer yoke 22 so that a gap is formed between the inner tubular member 11 and the outer tubular member 12.

The elastic member 13 which is thus positioned in the gap defined between the inner tubular member 11 and the outer tubular member 12 is made of a material having elasticity, such as rubber or other polymer material. The elastic member 13 consists of an upper elastic member 13A and a lower elastic member 13B. The upper elastic member 13A is a tubular member. The upper elastic member 13A is in contact with the outer peripheral surface of the upper outer yoke 22A and the upper tubular member 23A at the entire inner peripheral surface thereof, and the inner peripheral surface of the upper outer tubular member 12A at the entire outer peripheral surface thereof.

As shown in FIG. 4A, the bottom surface of the upper elastic member 13A is formed with a pair of first upper recesses 37A and 38A which are positioned diagonally opposite to each other about the axial line X and along a first direction Y orthogonal to the axial line X, and a pair of second upper recesses 39A and 40A which are positioned diagonally opposite to each other about the axial line X and along a second direction Z orthogonal to both the axial line X and the first direction Y. The first upper recesses 37A and 38A and the second upper recesses 39A and 40A are each recessed upward, and extend along the circumferential direction by a same angle which is slightly smaller than 90 degrees.

As shown in FIG. 4C, the lower elastic member 13B is also a tubular member similar to the upper elastic member 13A, and is in contact with the outer peripheral surface of the lower outer yoke 22B and the lower tubular member 23B at the entire inner peripheral surface thereof. The lower elastic member 13B is also in contact with the inner circumferential surface of the lower outer tubular member 12B at the entire outer circumferential surface thereof. The upper surface of the lower elastic member 13B is formed with a pair of first lower recesses 37B and 38B that are recessed downward at positions aligning with the first upper recesses 37A and 38A, respectively, and a pair of second lower recesses 39B, 40B that are recessed downward at positions aligning with the second upper recesses 39A and 40A.

The lower surface of the upper elastic member 13A and the upper surface of the lower elastic member 13B are joined to each other. As a result, the first upper recesses 37A and 38A and the first lower recesses 37B and 38B jointly define a pair of first liquid chambers 41P and 41Q, respectively, extending along the axial line X and opposing each other in the first direction Y. In the following disclosure, the first liquid chambers 41P and 41Q may be collectively referred to as "the first liquid chambers 41". Further, the second upper recesses 39A and 40A and the second lower recesses 39B and 40B jointly define a pair of second liquid chambers 42P and 42Q, respectively, extending along the axial line X and opposing each other in the second direction Z. In the following disclosure, the second liquid chambers 42P and 42Q may be collectively referred to as "the second liquid chambers 42".

As shown in FIG. 4A, the first openings 32A or the circumferential end portions of the first communication passage 47 are located radially inward of the first liquid chambers 41, and the elastic member 13 is provided with a pair of communication openings 44 communicating the first communication passage 47 to the respective first liquid chambers 41 via the first openings 32A, respectively. As shown in FIG. 4C, the second openings 32B or the circumferential end portions of the second communication passage 49 are located radially inward of the second liquid chambers 42, and the elastic member 13 is provided with a pair of communication openings 44 communicating the second communication passage 49 to the respective second liquid chambers 42 via the second openings 32B, respectively. Thus, as shown in FIG. 4A, the first liquid chambers 41 communicate with each other via the first communication passage 47 including the first circumferential passage 33, the two first openings 32A, and the communication openings 44. Further, as shown in FIG. 4B, the second liquid chambers 42 communicate with each other via the second communication passage 49 including the second circumferential passage 35, the two second openings 32B, and the communication openings 44.

In the present embodiment, the variable stiffness bushing assembly 1 is mounted to the lower arm 2 such that the first direction Y coincides with the fore and aft direction, and the second direction Z coincides with the lateral direction when the steering angle is zero to be exact.

As shown in FIGS. 4A and 4C, the magnetic fluid 50 is contained in the first liquid chambers 41, the second liquid chambers 42, the first communication passage 47, and the second communication passage 49. The magnetic fluid 50 may be an incompressible fluid containing iron particles dispersed in a solvent such as oil, and in particular, may consist of a fluid whose viscoelasticity, particularly viscosity changes depending on the intensity of the magnetic field applied thereto such as a magnetic viscoelastic fluid (MRF: Magnetorheological Fluid) and a magnetic viscoelastic compound (MRC: Magnetorheological Compound). In the present embodiment, MRC is used as the magnetic fluid 50. When a magnetic field is applied to the magnetic fluid 50, the fine particles of iron are arranged in chains extending along the direction of the magnetic field to form chain clusters. As a result, the flow of the solvent in the direction perpendicular to the magnetic field is hindered by the chain clusters, and the effective viscosity of the magnetic fluid 50 increases. The magnetic fluid 50 may even become almost solid.

As shown in FIG. 1, the upper coil 21A and the lower coil 21B are connected to different voltage sources 60A and 60B, respectively, and the voltage sources 60A and 60B are connected to a control unit 65 via signal lines. A control unit 65 is connected to onboard sensors 80 such as a steering angle sensor and an acceleration sensor.

The mode of operation of the variable stiffness bushing assembly 1 according to this embodiment is discussed in the following. When a load parallel to the first direction Y is applied to the variable stiffness bushing assembly 1, the elastic member 13 is deformed in such a manner that the volume of one of the first liquid chambers 41 increases, and the volume of the other first liquid chamber 41 decreases by a corresponding amount. As a result, the magnetic fluid 50 flows from one of the first liquid chambers 41 to the other first liquid chamber 41 via the first communication passage 47. The magnetic fluid 50 encounters resistance when flowing through the first communication passage 47 so that a damping force against the deformation in the Y direction is created by the variable stiffness bushing assembly 1.

Similarly, when a load directed parallel to the second direction Z is applied to the variable stiffness bushing assembly 1, the elastic member 13 is deformed in such a manner that the volume of one of the second liquid chambers 42 increases, and the volume of the other second liquid chamber 42 decreases by a corresponding amount. As a result, the magnetic fluid 50 flows from one of the second liquid chambers 42 to the other second liquid chamber 42 via the second communication passage 49. The magnetic fluid 50 encounters resistance when flowing through the second communication passage 49 so that a damping force against the deformation in the Z direction is created by the variable stiffness bushing assembly 1.

Figure 5A:
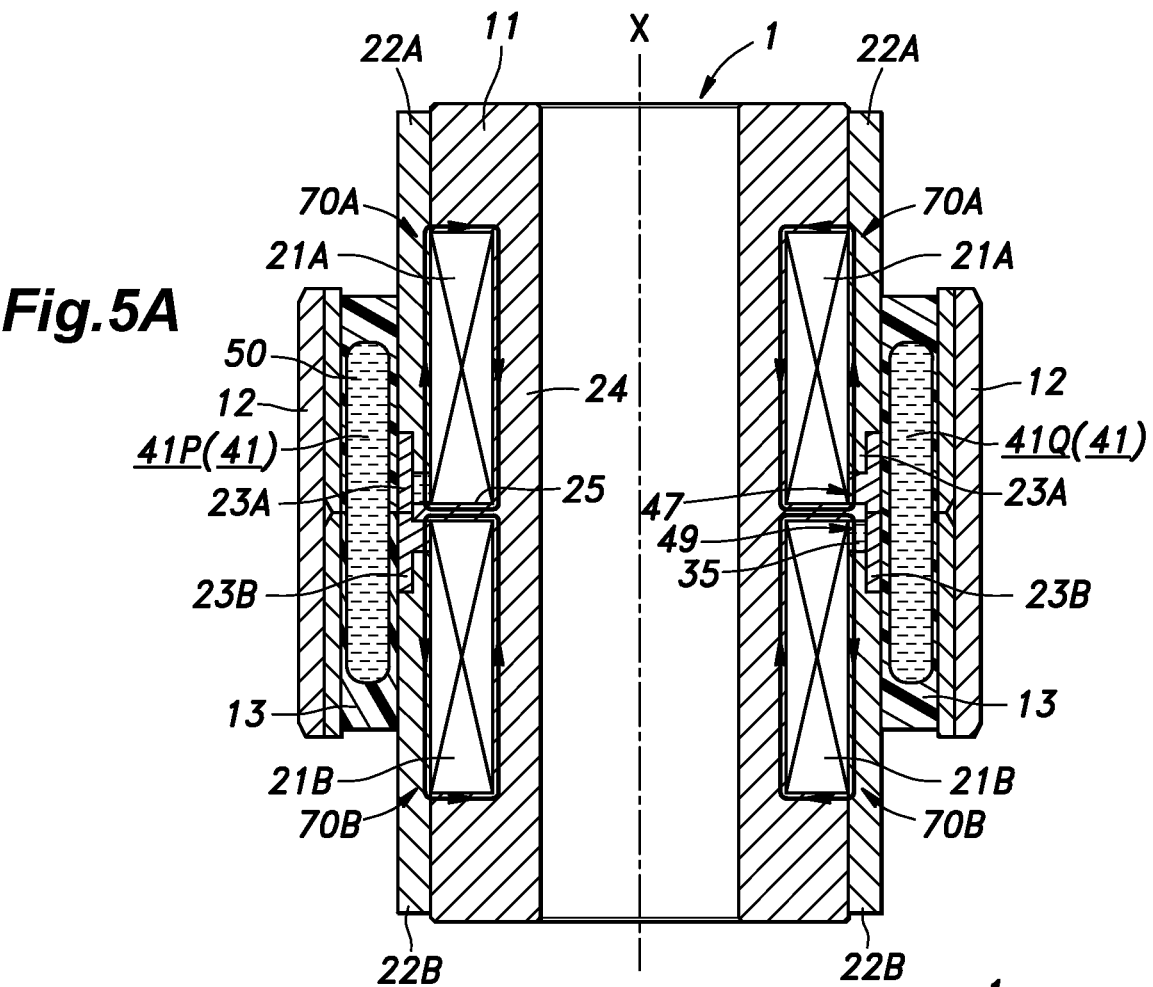
FIG. 5A is a vertical sectional view of the variable stiffness bushing assembly showing the magnetic flux produced from the coils of the variable stiffness bushing assembly.
Figure 5B:
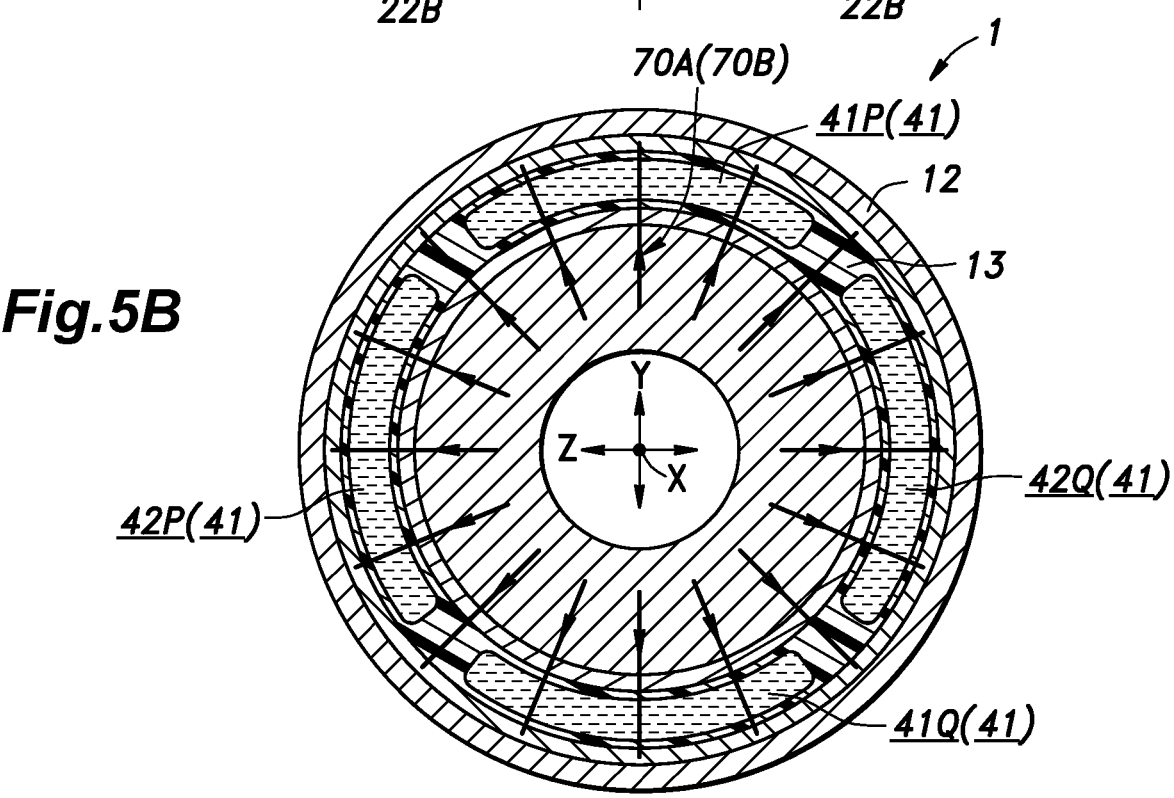
FIG. 5B is a cross sectional view of the variable stiffness bushing assembly showing the magnetic flux produced from the coils of the variable stiffness bushing assembly.

FIGS. 5A and 5B show the magnetic field lines in solid lines when an equal voltage is applied to the upper coil 21A and the lower coil 21B to create mutually opposing magnetic fields. As shown in FIG. 5A, the upper coil 21A and the lower coil 21B form respective magnetic circuits 70A and 70B. More specifically, the magnetic circuit 70A formed by the upper coil 21A generates a loop of magnetic flux that passes through the annular large diameter portion 25, the upper portion of the inner yoke main body 24, the upper annular flange 26, and the upper outer yoke 22A. At this time, the magnetic flux generated by the upper coil 21A in large part passes through the gap between the upper outer yoke 22A and the annular large diameter portion 25. Therefore, the magnetic circuit 70A of the upper coil 21A functions so as to concentrate the magnetic field generated by the upper coil 21A in the gap between the upper outer yoke 22A and the annular large diameter portion 25. Thus, the magnetic field generated by the upper coil 21A is effectively applied to the first communication passage 47. As a result, owing to the magnetic field, the viscosity of the magnetic fluid 50 contained in the first communication passage 47 increases, and the movement of the magnetic fluid 50 between the first liquid chambers 41 is hindered in such a manner that the deformation of the variable stiffness bushing assembly 1 is restricted when a load directed in the first direction Y is applied to the variable stiffness bushing assembly 1, and the stiffness of the variable stiffness bushing assembly 1 increases.

Similarly, the magnetic circuit 70B formed by the lower coil 21B generates a loop of magnetic flux that passes through the annular large diameter portion 25, the lower portion of the inner yoke main body 24, the lower annular flange 26, and the lower outer yoke 22B. At this time, the magnetic flux generated by the lower coil 21B in large part passes through the gap between the lower outer yoke 22B and the annular large diameter portion 25. Therefore, the magnetic circuit 70B of the lower coil 21B functions so as to concentrate the magnetic field generated by the lower coil 21B in the gap between the lower outer yoke 22B and the annular large diameter portion 25. Thus, the magnetic field generated by the lower coil 21B is effectively applied to the second communication passage 49. As a result, owing to the magnetic field, the viscosity of the magnetic fluid 50 contained in the second communication passage 49 increases, and the movement of the magnetic fluid 50 between the second liquid chambers 42 is hindered in such a manner that the deformation of the variable stiffness bushing assembly 1 is restricted when a load directed in the second direction Z is applied to the variable stiffness bushing assembly 1, and the stiffness of the variable stiffness bushing assembly 1 increases.

The advantages provided by the variable stiffness bushing assembly 1 are discussed in the following. When the current flowing through the upper coil 21A is made larger than the current flowing through the lower coil 21B by controlling the output voltages of the voltage sources 60A and 60B, the magnetic field applied to the first communication passage 47 gets larger than the magnetic field applied to the second communication passage 49. As a result, the stiffness in the first direction Y of the variable stiffness bushing assembly 1 can be more increased than the stiffness in the second direction Z. Similarly, when the current flowing through the lower coil 21B is increased, the magnetic field applied to the second communication passage 49 becomes larger than the magnetic field applied to the first communication passage 47 so that the stiffness of the variable stiffness bushing assembly 1 in the second direction Z is more increased than in the first direction Y. In this way, by controlling the magnitude of the current flowing in the upper coil 21A and the magnitude of the current flowing in the lower coil 21B, the stiffness in the two directions of orthogonal to the axial direction X (the first direction Y and the second direction) of the variable stiffness bushing assembly 1 can be individually controlled.

When the road surface is uneven or a large braking force applied to the wheel, a load directed rearward may be applied to the wheel, and is transmitted to the variable stiffness bushing assembly 1. In such a case, the control unit 65 increases the stiffness in the fore and aft direction (or in the first direction Y) by controlling the voltage output from the voltage source 60A so as to increase the current flowing through the upper coil 21A.

When the vehicle corners at a high speed, the vehicle body may tilt outward in the turning direction due to the centrifugal force caused by the cornering. As a result, the downward force of the wheel located on the outer side with respect to the cornering direction is increased, and the lateral force directed toward the laterally inner side acts on the wheel with respect to the cornering direction. In such a case, the control unit 65 controls the voltage output from the voltage source 60B to increase the current flowing in the lower coil 21B so that the stiffness of the variable stiffness bushing assembly 1 in the lateral direction (or in the second direction Z) is increased. As a result, the wheel is prevented from being excessively displaced relative to the vehicle body so that the handling of the vehicle can be improved.

Figure 6:
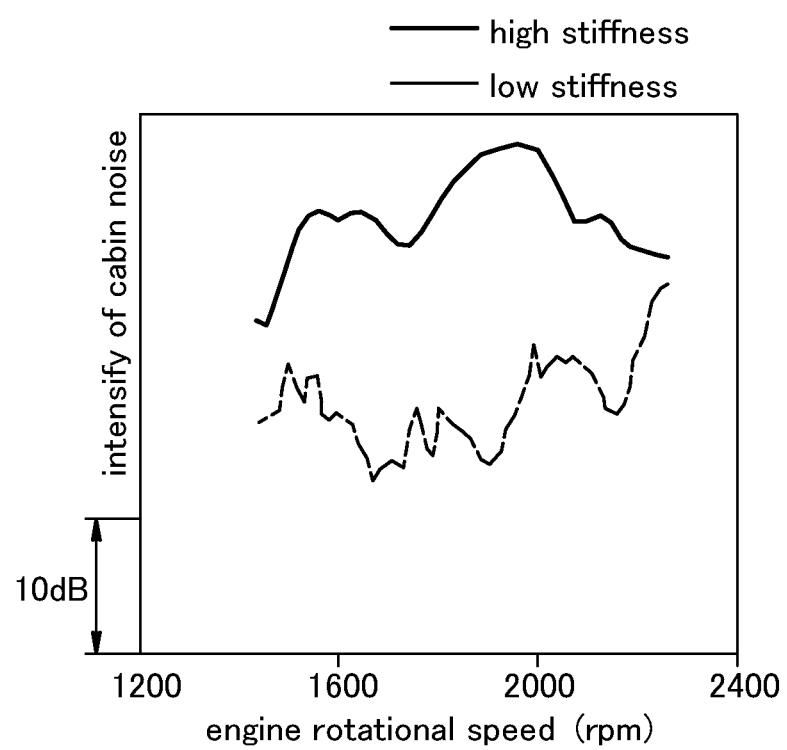
FIG. 6 is a graph showing the relationship between the engine rotational speed and the cabin noise in a high stiffness condition (solid line) and a low stiffness condition (broken line).

On the other hand, when the road surface is comparatively smooth or the braking force applied to the wheel is small, the control unit 65 decreases the voltage output from each of the voltage sources 60A and 60B. Thereby, the electric current which flows into upper coil 21A and lower coil 21B decreases so that the stiffness of the variable stiffness bushing assembly 1 decreases. FIG. 6 shows the engine speed dependency of the noise intensity (in decibels) transmitted to the passenger compartment when the stiffness is increased (solid line) and when the stiffness is decreased (broken line). As shown in FIG. 6, by reducing the stiffness of the variable stiffness bushing assembly 1, the vibration can be absorbed by the variable stiffness bushing assembly 1, and the noise intensity in the passenger compartment can be reduced.

Thus, in the case of a wheel suspension device incorporated with the variable stiffness bushing assembly 1, when the handling of the vehicle is desired to be improved, the stiffness of the variable stiffness bushing assembly 1 can be increased along the direction in which the load is applied. Conversely, when the vibration and noise are desired to be reduced, the stiffness of the variable stiffness bushing assembly 1 can be reduced so that the transmission of vibration and noise to the passenger compartment may be reduced.

The coil 21 consisting of a solenoid coil generally generates a strong magnetic field inside the inner bore thereof owing to the current flowing through the coil 21. Therefore, in the variable stiffness bushing assembly 1 in which the stiffness is made variable by using the magnetic fluid 50, it is preferable to provide a flow passage of the magnetic fluid 50 in the inner bore of the coil 21 where the strong magnetic field is generated. However, it is impractical in most cases to provide the flow passage of the magnetic fluid 50 in the inner bore of the coil 21.

In this embodiment, as shown in FIG. 5A, the direction of the magnetic field generated in the upper coil 21A and the direction of the magnetic field generated in the lower coil 21B are opposite to each other. As a result, the magnetic field lines from the upper coil 21A and the magnetic field lines from the lower coil 21B extend radially outward and away from each other as shown in FIG. 5B. The magnetic field lines extend through the gap between the upper coil 21A and the lower coil 21B in radially outward direction, and vertically upward and downward directions, respectively. As a result, a sufficiently strong magnetic field is applied to the first communication passage 47 and the second communication passage 49 extending along the outer circumference of the inner bore of the upper coil 21A and the lower coil 21B in a top view so that the viscosity of the magnetic fluid 50 can be changed in a significant way.

In order to maximize the variable range of the stiffness of the variable stiffness bushing assembly 1, it is preferable to reduce the cross sectional area of the flow passage of the magnetic fluid 50 and increase the length of the flow passage of the magnetic fluid 50. In the present embodiment, since the first liquid chambers 41 are positioned diagonally apart from each other along the circumferential direction, and so are the second liquid chambers 42, the first communication passage 47 and the second communication passage 49 connecting them are elongated in the circumferential direction. Therefore, between the first liquid chambers 41 and between the second liquid chambers 42, the movement of the fluid is strongly affected by the magnetic field so that the variable range of the stiffness of the variable stiffness bushing assembly 1 can be maximized.

The gaps SA and SB between the annular large diameter portion 25 and the outer yoke 22 are respectively filled by the protruding portions 31 of the intermediate tubular member 23 so that the first circumferential passage 33 and the second circumferential passage 35 extend circumferentially in an arcuate manner. If the protruding portions 31 were absent, the gap between the annular large diameter portion 25 and the outer yoke 22 would be fully annular, and the first liquid chambers 41 and the second liquid chambers 42 would be commonly communicated with one another via a pair of arcuate passages connected in parallel to each other. In such a case, when a magnetic field is applied to the two arcuate flow passages in an uneven manner, the magnetic fluid 50 is allowed to flow between the two liquid chambers through either one of the flow passages having a lower flow resistance. For this reason, the movement of the magnetic fluid between the paired chambers would not be impeded so much as desired. In this embodiment, since the protruding portion 31 is provided and the corresponding two liquid chambers are connected by a single first communication passage 47 having an arcuate shape, or a single second communication passage 49 having an arcuate shape, the flow of the magnetic fluid 50 between the corresponding liquid chambers can be hindered to a significant extent. Therefore, according to the present embodiment, the movement of the magnetic fluid between the corresponding liquid chambers can be effectively impeded by the magnetic field thereto so that the stiffness of the variable stiffness bushing assembly 1 can be controlled in an effective manner.

The intermediate tubular member 23 is disposed between the two outer yokes 22, and the intermediate tubular member 23 fills the gap SA and the gap SB from the radially outer direction so as to define the first communication passage 47 and the second communication passage 48 in an arcuate shape. In this conjunction, since the intermediate tubular member 23 is formed of a material having a low magnetic permeability, the magnetic circuits 70A and 70B are not disturbed by the presence of the intermediate tubular member 23 between the outer yokes 22, and a magnetic field can be applied to the first communication passage 47 and the second communication passage 48 in a favorable manner as shown in FIG. 5.

The present invention has been described in terms of a specific embodiment, but is not limited by such an embodiment, and can be modified in various ways without departing from the scope of the present invention.

The invention claimed is:

1. A variable stiffness bushing assembly, comprising:
an inner tubular member:
an outer tubular member coaxially surrounding the inner tubular member to define a gap therebetween;
an elastic member positioned in the gap and connecting the inner tubular member and the outer tubular member to each other;
wherein the inner tubular member includes a tubular inner yoke having an annular large diameter portion extending radially outward, a pair of coils wound coaxially around respective parts of an outer periphery of the inner yoke located on either axial side of the annular large diameter portion so as to generate magnetic fields directed in mutually opposing directions, and a pair of tubular outer yokes disposed coaxially with respect to the inner yoke, each surrounding the corresponding coil and each connected to the inner yoke at one axial end thereof located on an axial end portion of a corresponding one of the coils remote from another of the coils, another axial end of each outer yoke axially opposing the annular large diameter portion via a space,
wherein the elastic member defines a pair of first liquid chambers that are on opposite sides of an axial line of the inner tubular member, the first liquid chambers being communicated with each other via a first communication passage defined at the gap between the opposing axial end of one of the outer yokes and the annular large diameter portion and extending circumferentially, and a pair of second liquid chambers that are on opposite sides of the axial line of the inner tubular member, the second liquid chambers being communicated with each other via a second communication passage defined at the gap between the opposing axial end of another one of the outer yokes and the annular large diameter portion and extending circumferentially,
the first liquid chambers, the second liquid chambers, the first communication passage, and the second communication passage being filled with a magnetic fluid having a viscosity that changes depending on an intensity of a magnetic field applied thereto, and
wherein a first circumferential passage and a second circumferential passage are passed between the annular large diameter portion and the outer yokes,
wherein the first circumferential passage and the second circumferential passage are spaced apart from each other in the axial direction via the annular large diameter portion, and
wherein the first circumferential passage is disposed on a radially outer side of an end of one of the coils, and the second circumferential passage is disposed on a radially outer side of an end of another one of the coils.

2. The variable stiffness bushing assembly according to claim 1, wherein the first liquid chambers are arranged in a first direction orthogonal to the axial line of the inner tubular member, and the second liquid chambers are arranged in a second direction orthogonal to the first direction and the axial line of the inner tubular member.

3. The variable stiffness bushing assembly according to claim 1, further comprising an intermediate tubular member made of nonmagnetic material and surrounding gaps defined between the annular large diameter portion and the outer yokes from outside, the intermediate tubular member defining the first communication passage and the second communication passage in cooperation with the annular large diameter portion and the outer yokes.

4. The variable stiffness bushing assembly according to claim 3, wherein the intermediate tubular member is provided with a pair of protruding portions protruding radially inward and extending circumferentially, and abutting against an outer periphery of the coils.

5. The variable stiffness bushing assembly according to claim 1, wherein the variable stiffness bushing assembly is configured to be interposed between an inboard end of an arm member of a wheel suspension device and a vehicle body.

* * * * *